(12) United States Patent
Pulliam et al.

(10) Patent No.: US 9,693,568 B2
(45) Date of Patent: Jul. 4, 2017

(54) SCRUBBER SYSTEM

(71) Applicant: Brush Solutions, LLC, Rutledge, GA (US)

(72) Inventors: Terry Pulliam, Covington, GA (US); William Bell, Lawrenceville, GA (US)

(73) Assignee: Brush Solutions, LLC, Rutledge, GA (US)

( * ) Notice: Subject to any disclaimer, the term of this patent is extended or adjusted under 35 U.S.C. 154(b) by 0 days.

(21) Appl. No.: 14/607,030

(22) Filed: Jan. 27, 2015

(65) Prior Publication Data
US 2015/0208678 A1  Jul. 30, 2015

Related U.S. Application Data

(60) Provisional application No. 61/932,228, filed on Jan. 27, 2014.

(51) Int. Cl.
*A22C 21/00* (2006.01)
*A22C 21/02* (2006.01)

(52) U.S. Cl.
CPC .................................. *A22C 21/022* (2013.01)

(58) Field of Classification Search
CPC ....... A46B 7/10; A46B 13/001; A46B 13/003; A46B 13/005; A46B 13/006; A46B 220/1093
USPC ........................................... 15/179, 181–183
See application file for complete search history.

(56) References Cited

U.S. PATENT DOCUMENTS 2,349,643 A   5/1944   Wesemeyer
2,409,309 A   10/1946  Peterson
2,797,425 A   7/1957   Benyak
(Continued)

FOREIGN PATENT DOCUMENTS

WO   2015/113064 A1   7/2015

OTHER PUBLICATIONS

International Search Report and Written Opinion for International Application No. PCT/US2015/013135 (WO2015/113064A1) mailed May 8, 2015; 6 pgs.

*Primary Examiner* — Richard Price, Jr.
(74) *Attorney, Agent, or Firm* — Merchant & Gould PC; R. Stevan Coursey

(57) ABSTRACT

The present disclosure describes a scrubber system for removing material from, or smoothing the surface of, an object. According to an example embodiment, the scrubber system comprises one or more scrubbing disks, spacer disks, and retaining collars configured for interlocking with other cooperatively configured scrubbing disks and spacer disks. The scrubbing and spacer disks are arrangeable end-to-end along a shaft extending therethrough and between opposed retaining collars to form a scrubber custom-configured for a particular application. The scrubbing disks may include one or more types arranged, with or without any spacer disks, in any desired configuration. When the scrubbing disks and/or spacer disks are positioned adjacent one another end-to-end, lateral and end mating surfaces at the adjacent ends of the respective scrubbing and/or spacer disks abut one another, limiting relative rotation therebetween and substantially forming a single, contiguous outer surface that prevents removed material from becoming lodged therebetween.

32 Claims, 11 Drawing Sheets

(56) References Cited

U.S. PATENT DOCUMENTS

| | | | | |
|---|---|---|---|---|
| 2,825,081 A * | 3/1958 | Grogan | A46B 13/006 | 15/181 |
| 3,080,637 A * | 3/1963 | Dutt | D06C 11/00 | 15/181 |
| 3,107,382 A * | 10/1963 | Tilgner | A46B 13/006 | 15/182 |
| 3,193,866 A * | 7/1965 | Jones | A46B 13/006 | 15/182 |
| 3,643,281 A * | 2/1972 | Schofield | A46B 3/14 | 15/181 |
| 3,839,763 A * | 10/1974 | Gould | A46B 13/003 | 15/181 |
| 4,490,877 A * | 1/1985 | Drumm | A46B 3/14 | 15/179 |
| 7,828,023 B2 * | 11/2010 | Patureaux | B01J 8/003 | 141/180 |
| 8,276,596 B2 * | 10/2012 | Marciniak-Davoult | A45D 40/265 | 132/200 |
| 9,127,425 B2 * | 9/2015 | Outcalt | E01C 19/203 | |
| 9,173,534 B2 * | 11/2015 | Ando | A47L 9/0477 | |
| 9,232,851 B2 * | 1/2016 | Manici | A46B 9/021 | |

* cited by examiner

SCRUBBER SYSTEM

FIELD OF THE INVENTION

The present invention relates, generally, to the field of apparatuses and methods for scrubbing or brushing an article to remove material from an outer surface of the article.

BACKGROUND OF THE INVENTION

Brushes have been used for many years in connection with removing material or polishing the outer surfaces of various articles, work pieces, or items. Typically, such brushes include a cylindrical hub to which a plurality of bristles are secured and extend in a radial direction. The bristles may be manufactured from a variety of different synthetic and non-synthetic materials with the selection of a material for a brush's bristles often depending on the particular application for which the brush is to be used. The cylindrical hub generally has bore extending between the hub's ends and adapted to allow the brush to be mounted on a shaft and rotated at a rotational speed appropriate for the brush and the particular application for the brush. An article, work piece or item is introduced into contact with the rotating brush to enable the brush's bristles to contact the article, work piece or item's outer surface. Through engagement of the outer surface with the rotating bristles, material may be removed from the outer surface and/or the outer surface may be smoothed and polished.

In the poultry processing industry, brushes are used to remove feathers from birds as a precursor to further processing. The birds are brought into contact with one or more rotating brushes via a conveyor system. The rotating brushes engage the birds' skin and feathers, removing the feathers from the skin and making the birds ready for rendering. The brushes for this application may have bristles secured to the brushes' hubs through a number of different methods. In one method, the bristles are secured to an inner surface of the hub and protrude through openings in the hub in a radial direction. In another method, the bristles are stapled to an outer surface of the hub and protrude from the hub in a radial direction. Unfortunately, both methods of securing the bristles often result in biological material from the birds becoming trapped in the openings and by the staples, making cleaning of the brushes to meet U.S. Food and Drug Administration (FDA) standards difficult and time-consuming.

Therefore, there is a need in the industry for a brush that may be used in connection with poultry processing to remove feathers from poultry birds and/or in other applications for removal of material from or polishing of a surface, that is easy to clean as required by U.S. Food and Drug Administration (FDA) standards, and that solves these and other difficulties, shortcomings, or problems of current technology.

SUMMARY OF THE INVENTION

Broadly described, the present invention comprises a scrubber system for removing material from or smoothing a surface of an object. In accordance with an example embodiment described herein, the scrubber system comprises a scrubbing disk configured for interlocking with other cooperatively configured scrubbing disks, spacers, and retaining collars. The scrubbing disks and spacers are arrangeable end-to-end along a shaft extending therethrough and between opposed retaining collars to form a scrubber that is custom-configured to be appropriate for a particular application. The scrubbing disks of a scrubber may include scrubbing disks of one or more types that may be arranged, with or without any spacer disks, in any desired configuration. For example and not limitation, a first scrubber configuration may include scrubbing disks of the same type that are separated by and interlocked end-to-end with a spacer disk along a shaft, while a second scrubber configuration may include scrubbing disks of multiple types with the scrubbing disks of each type being interlocked together end-to-end in respective groups along a shaft.

According to the example embodiment, each scrubbing disk defines a longitudinal axis and comprises a rim in the form of a spiral helix extending about the longitudinal axis between the scrubbing disk's longitudinally opposed ends. The rim extends about a web of the scrubbing disk and has opposed lateral mating surfaces and opposed end mating surfaces. The web defines a bore therethrough having a shape selected to receive a cooperatively shaped shaft and, together with the shaft, for substantially limiting relative rotation between the scrubbing disk and the shaft. The opposed lateral and end mating surfaces of the scrubbing disk are arranged with a first lateral mating surface and a first end mating surface being located at the scrubbing disk's first end and a second lateral mating surface and a second end mating surface being located at the scrubbing disk's second end. Each spacer disk is configured similarly to the scrubbing disk and includes similarly disposed mating surfaces. When scrubbing disks and/or spacer disks are positioned adjacent one another end-to-end along a shaft as in a scrubber, the lateral and end mating surfaces at the adjacent ends of the respective scrubbing disks and/or spacer disks abut one another. Such abutment of the respective end mating surfaces substantially limits relative rotation between the adjacent scrubbing disks and/or spacer disks, while abutment of the respective lateral and end mating surfaces causes the outwardly facing surfaces of the respective rims to substantially form a single, contiguous outer surface that prevents biological or other material from becoming lodged between the scrubbing disks and/or spacer disks.

Also according to the example embodiment, each scrubbing disk includes multiple bristles extending from the rim of the scrubbing disk. Each bristle may be configured the same as or differently from other bristles of the scrubbing disk such that the particular configuration of the bristles of a scrubbing disk comprises a factor defining the type of the scrubbing disk. Generally, each bristle includes a body extending at a first end from the rim of the scrubbing disk and one or more barbs protruding from the body near a second end thereof. In different types of scrubbing disks and even within a particular scrubbing disk type, the bristle bodies may differ in number and/or angular spacing about a scrubbing disk's longitudinal axis, may have the same or different lengths, and may have constant or varying cross-sectional shapes and sizes at different locations between the bodies' ends. Additionally, in different types of scrubbing disks and even within a particular scrubbing disk type, the bristles may include a single barb or multiple barbs with each barb being located at a different distance from an end of the bristle's body, with each barb being located at the same or different distances from other barbs, and with each barb having the same or different shapes and/or dimensions.

Advantageously, using and applying the present invention, scrubbers having configurations for specific applications with different numbers and types of scrubbing disks are possible. Scrubber configurations with certain types of scrubbing disks, or groups of scrubbing disks, positioned and/or spaced apart at desired locations relative to one another are also possible. At least by virtue of the almost endless number and varieties of scrubber disks and scrubber configurations and at least by virtue of the scrubber disks, spacer disks, and retaining collars of such configurations interlocking with one another, a scrubber may be adapted and configured to remove material from an object (including, but not limited to, feathers from poultry birds during processing) or polish an object while substantially eliminating the lodging of biological or other material between components, thereby making the scrubber more easily and more thoroughly cleanable and maintainable.

Other uses, advantages and benefits of the present invention may become apparent upon reading and understanding the present specification when taken in conjunction with the appended drawings.

DETAILED DESCRIPTION OF THE DRAWINGS

Figure 1:
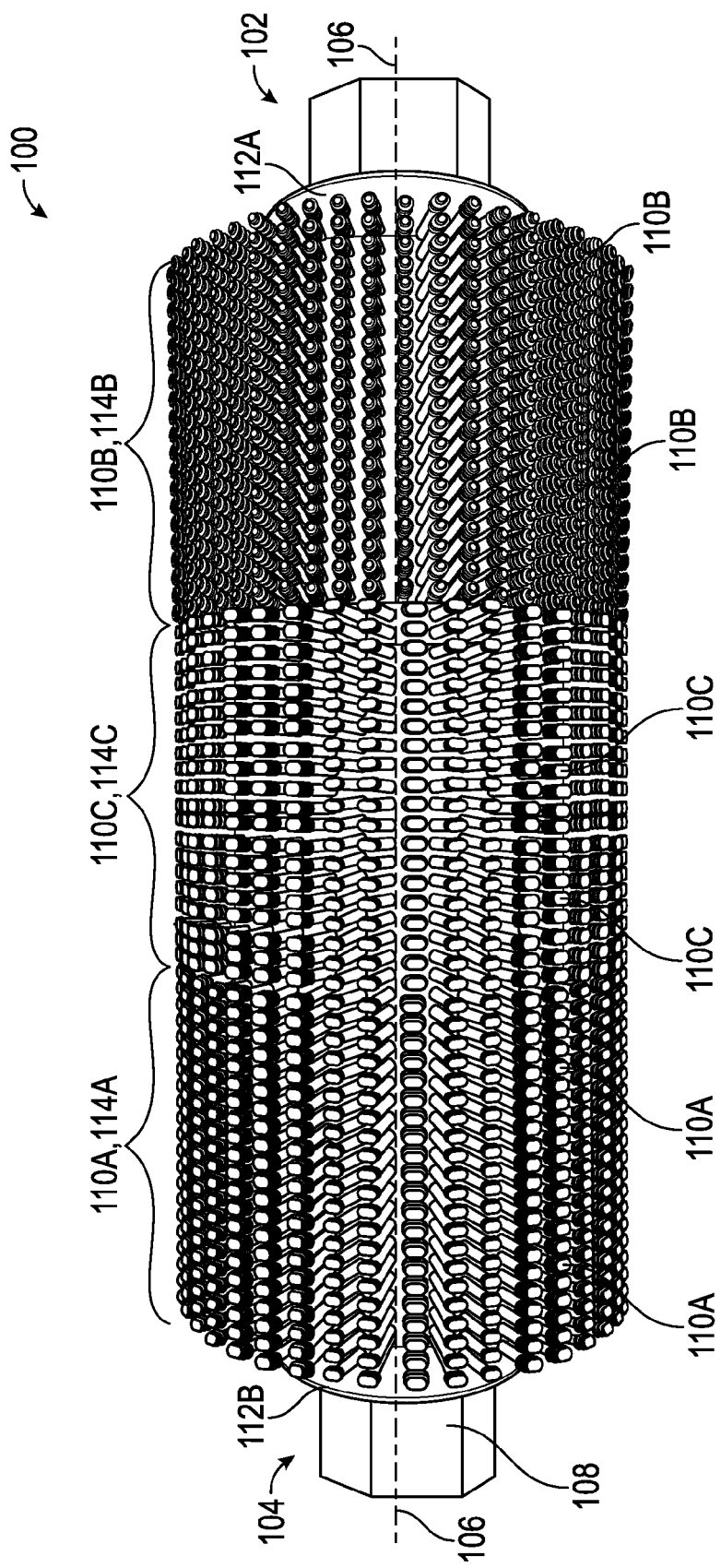
FIG. 1 displays a pictorial, side elevational view of a scrubber of a first configuration, in accordance with an example embodiment of the present invention, including scrubber disks of multiple types.

Referring now to the drawings in which like numerals represent like elements or steps throughout the several views, FIG. 1 displays a pictorial, side elevational view of a scrubber 100 of a first configuration in accordance with an example embodiment. The scrubber 100 is employed to remove material from an article that is brought into contact with the scrubber 100 while the scrubber 100 is rotated at an appropriate rotational speed. The scrubber 100 is generally mounted in a frame or piece of equipment using bearings to support and permit rotation of the scrubber 100. The scrubber 100 has a first end 102 and an opposed second end 104 that define a central longitudinal axis 106 extending therethrough, and comprises a drive shaft 108 extending collinearly with and about the central longitudinal axis 106. The drive shaft 108 is rotatable about the central longitudinal axis 106 with rotary motion being imparted to the drive shaft 108 by a variable speed motor, by a pulley coupled via a belt to single speed motor, by a sprocket connected by a roller chain to a single speed motor, or any other drive mechanism, transmission, or assembly capable of causing rotation of the drive shaft 108. According to the example embodiment, the drive shaft 108 is manufactured from stainless steel and has a hexagonal cross-section perpendicular to the central longitudinal axis 106. However, it should be understood and appreciated that the drive shaft 108 may be manufactured from another material appropriate for a particular other embodiment of the scrubber 100 and may have a cross-section perpendicular to the central longitudinal axis 106 having a circular shape, partial-circular shape, circular shape with a flat or keyway, arcuate shape, rectangular shape, square shape, triangular shape, polygonal shape, or other shape corresponding to a combination of any of the foregoing shapes.

The scrubber 100 also comprises a plurality of scrubber disks 110 and a pair of opposed retaining collars 112, and are all mounted about the central longitudinal axis 106 and drive shaft 108. The retaining collars 112 are secured to the drive shaft 108 once the scrubber 100 is assembled as described below. The plurality of scrubber disks 110 are mounted adjacent to and against one another between the pair of retaining collars 112 such that each retaining collar 112 engages an adjacent scrubber disk 110, holds each scrubber disk 110 tightly against and engagement with each adjacent scrubber disk 100 without gaps therebetween, and prevents movement of all of the scrubber disks 110 in a direction along the central longitudinal axis 106.

The plurality of scrubber disks 110 of the first configuration of the scrubber 100 include a first group 114A of scrubber disks 110A of a first type, a second group 114B of scrubber disks 110B of a second type, and a third group 114C of scrubber disks 110C of a third type. In the first configuration illustrated in FIG. 1, the scrubber disks 110A of the first group 114A are arranged adjacent and in contact with one another, the scrubber disks 110B of the second group 114B are arranged adjacent and in contact with one another, and the scrubber disks 110C of the third group 114C are arranged adjacent and in contact with one another. Also, the scrubber disks 110B of the second group 114B are configured between the scrubber disks 110A of the first group 114A and the scrubber disks 110C of the third group 114C.

It should be understood and appreciated, however, that in other configurations (such as, but not limited to, the second configuration of FIG. 6 described below) any of the scrubber disks 110A, 110B, 110C may be arranged along the drive shaft 108 adjacent to and in contact with any of the other scrubber disks 110A, 110B, 110C. Thus, for example and not limitation, a scrubber disk 110A of the first type may be arranged adjacent to and in contact with a scrubber disk 110B of the second type on one side and adjacent to and in contact with a scrubber disk 110C of the third type on the other side. By virtue of the substantially large number of possible types of scrubber disks 110 and the substantially large number of possible configurations of scrubber disks 110 along a drive shaft 108, an almost endless number of scrubber types may be created. Further, scrubbers 100 may be custom configured using particular types of scrubber disks 110 that are arranged in particular configurations for use in particular applications.

Figure 2:
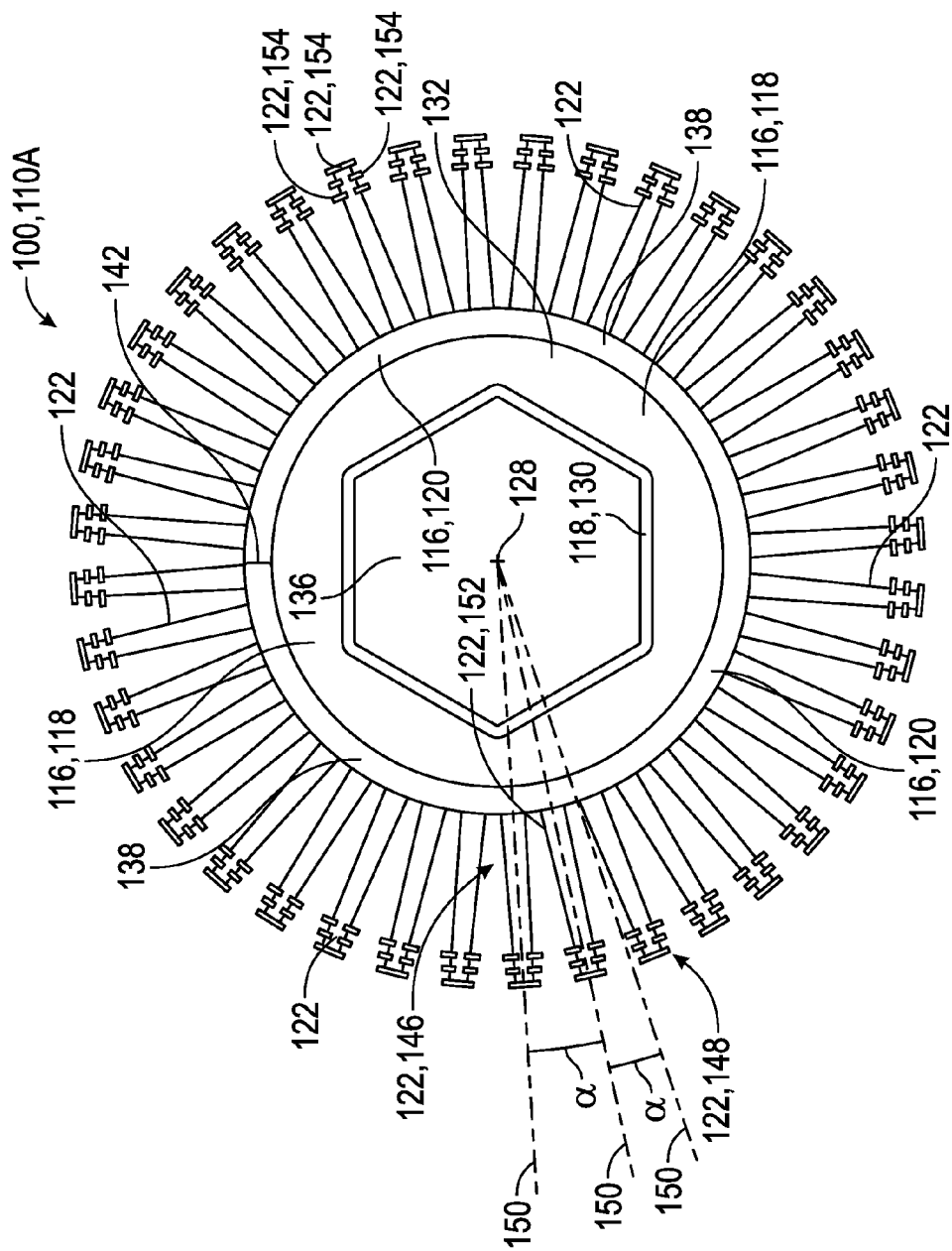
FIG. 2 displays a pictorial, perspective end view of a scrubber disk of a first type in accordance with an example embodiment of the present invention.
Figure 3:
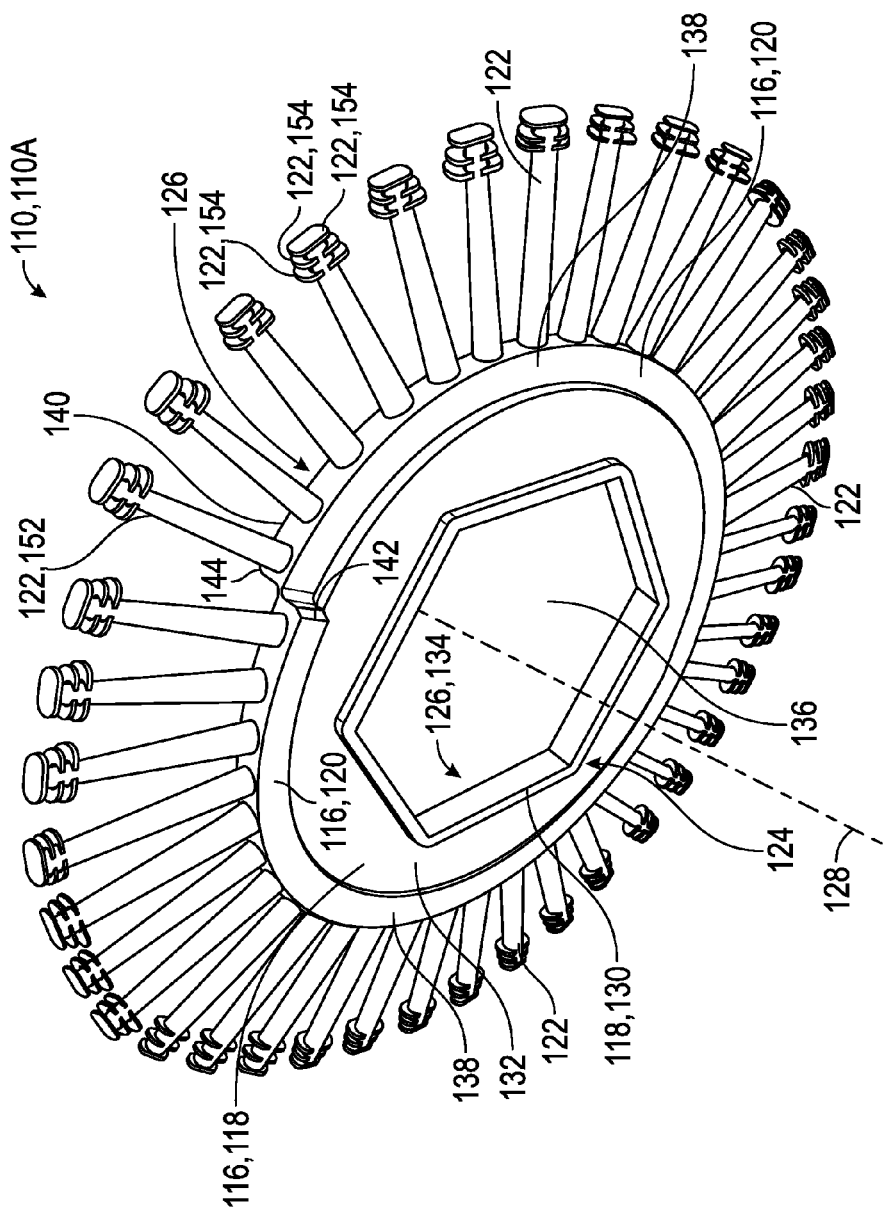
FIG. 3 displays a pictorial, perspective view of the scrubber disk of FIG. 2.

FIGS. 2 and 3 display pictorial views of a scrubber disk 110A of a first type in accordance with an example embodiment. The scrubber disk 110A comprises a hub 116 having a web 118 and a rim 120, and having a plurality of bristles 122 protruding and extending from the rim 120. The web 118 has a substantially cylindrical shape with a first end 124 and an opposed second end 126, and extends radially about and longitudinally parallel to a central longitudinal axis 128 of the scrubber disk 110A. The web 118 has a boss 130 protruding in the longitudinal direction from the web's surface 132 at the web's first end 124. The boss 130 protrudes from the web's surface 132 by a distance that causes the boss 130 to come into contact with the web surface 134 at the second end 126 of another scrubber disk 110, a spacer disk 156 (described below with reference to FIG. 6 and FIGS. 9-12), or a retaining collar 112 and provide proper registration and spacing of the scrubber disk 110A with respect to such other scrubber disk 110, spacer disk 156, or retaining collar 112 in the longitudinal direction along the scrubber's drive shaft 108.

The web 118 and boss 130 define a bore 136 extending therethrough about the scrubber disk's central longitudinal axis 128. The bore 136 is sized and shaped to cooperatively receive the scrubber's drive shaft 108 therethrough, and to prevent relative rotation of the scrubber disk 110A about the drive shaft 108. According to the example embodiment, the bore 136 has a hexagonal cross-section perpendicular to the scrubber disk's central longitudinal axis 128 similar to the hexagonal cross-section of the scrubber's drive shaft 108. However, it should be understood and appreciated that in other embodiments, the bore 136 and drive shaft 108 may have many different cooperative cross-sectional shapes as described above with respect to the drive shaft 108, and the web 118, boss 130 and drive shaft 108 may utilize keys/keyways, internal/external teeth, and/or other structures or devices alone or in combination with such cross-sectional shapes to prevent relative rotation of the scrubber disk 110A about the drive shaft 108.

The rim 120 of the scrubber disk 110A extends from and around the web 118 through an angular measure of substantially three hundred sixty degrees (360°) and at a radial distance from and about the scrubber disk's central longitudinal axis 128 (and at the radial extent of the web 118) to form a portion of a spiral helix about the central longitudinal axis 128. By virtue of the spiral helix form, the rim 120 protrudes partially from the web surface 132 at the scrubber disk's first end 124 and partially from the web surface 134 at the scrubber disk's second end 126. The rim 120 has a generally constant-size, rectangular cross-section when cut by a plane extending in the scrubber disk's longitudinal direction and diametrically from and including the scrubber disk's central longitudinal axis 128 (as opposed to a plane extending perpendicular to the central longitudinal axis 128). The rim 120 has a lateral first surface 138 at the scrubber disk's first end 124 and a longitudinally opposed lateral second surface 140 at the scrubber disk's second end 126. The rim's lateral first and second surfaces 138, 140 abut and contact cooperatively disposed similar surfaces of other scrubber disks 110, spacer disks 156, or a retaining collar 112. Also, the rim 120 has a third surface 142 at the scrubber disk's first end 124 that corresponds to the spiral helix's beginning location, and a fourth surface 144 at the scrubber disk's second end 126 that corresponds to the spiral helix's ending location. The rim's third and fourth surfaces 142, 144 form shoulders for abutting and engaging cooperatively disposed similar shoulders of other scrubber disks 110, spacer disks 156, or a retaining collar 112.

More particularly, in a scrubber 100, the rim's first and third surfaces 138, 142 contact and engage the cooperatively disposed second and fourth surfaces 140, 144 of the rim 120 of a scrubber disk 110, spacer disk 156, or retaining collar 112 positioned adjacent the first end 124 of the scrubber disk 110A to properly register and position the scrubber disk 110A relative to such other scrubber disk 110, spacer disk 156, or retaining collar 112. Also, the rim's second and fourth surfaces 140, 144 contact and engage the cooperatively disposed first and third surfaces 138, 142 of the rim 120 of a scrubber disk 110, spacer disk 156, or retaining collar 112 positioned adjacent the second end 126 of the scrubber disk 110A to properly register and position the scrubber disk 110A relative to such other scrubber disk 110, spacer disk 156, or retaining collar 112. Through the contact, engagement and registration between the surfaces 138, 140, 142, 144 of the scrubber disk 110A and those cooperatively disposed surfaces 138, 140, 142, 144 of adjacent scrubber disks 110, spacer disks 156, or retaining collars 112, there are essentially no gaps present between the rim 120 of the scrubber disk 110A and the cooperatively disposed and engaged rims 120 of such other scrubber disks 110, spacer disks 156, or retaining collars 112. Because there are essentially no gaps present, material being removed from an article by the scrubber 100 cannot get trapped between longitudinally the rims 120 of adjacent scrubber disks 110, spacer disks 156, or retaining collars 112, thereby minimizing the extent of cleaning required to clean the scrubber 100 after use.

As briefly described above, the bristles 122 protrude and extend from the rim 120 of the scrubber disk 110A. During use of the scrubber 100, the bristles 122 rotate with the drive shaft 108 about the scrubber's central longitudinal axis 106, come into contact with the article from which material is to be removed, and dislodge the material from the surface of the article. Each bristle 122 extends radially from the scrubber disk's rim 120 and has a first end 146 at the rim 120 and a second end 148 distant from the rim 120. A radially-extending longitudinal axis 150 extends between and through the first and second ends 146, 148 of the bristle 122. Generally, the longitudinal axis 150 of each bristle 122 is located at an angle, α, relative to the longitudinal axes 150 of the nearest other bristles 122 such that the bristles 122 are spaced apart in a substantially equal manner around the periphery of the scrubber disk's rim 120. In accordance with the example embodiment, the scrubber disk 110A includes forty (40) bristles 122 spaced with equal angular separation around the rim 120 of the scrubber disk 110A.

Each bristle 122 comprises a body 152 that extends between the bristle's first and second ends 146, 148. According to the example embodiment, the body 152 of each bristle 122 of the scrubber disk 110A has a cross-section perpendicular to the bristle's longitudinal axis 150 having a rounded rectangular shape. Further, the body 152 of each bristle 122 generally tapers between the bristle's first and second ends 146, 148 such that the cross-sectional area of the bristle 122 is largest at the bristle's first end 146 and is smallest at the bristle's second end 148.

Additionally, each bristle 122 has a plurality of barbs 154 near the bristle's second end 148 that are, according to the example embodiment, equally spaced relative to one another. According to the example embodiment, each bristle 122 has three (3) barbs 154. Each barb 154 protrudes perpendicularly from the bristle's longitudinal axis 150 and extends at least partially around and from the bristle's body 152. Each barb 154 typically has a cross-section perpendicular to the bristle's longitudinal axis 150 having a generally rounded rectangular shape. The cross-sectional area of each barb 154 becomes progressively smaller with the barb's location relative to the bristle's second end 148 such that the cross-sectional area of the barb 154 nearest the bristle's first end 146 is largest and the cross-sectional area of the barb 154 nearest the bristle's second end 148 is smallest. During the scrubber's use, the barbs 154 engage the material to be removed from the article introduced to the scrubber 100 and tend to rip and tear such material away from the article.

Figure 4:
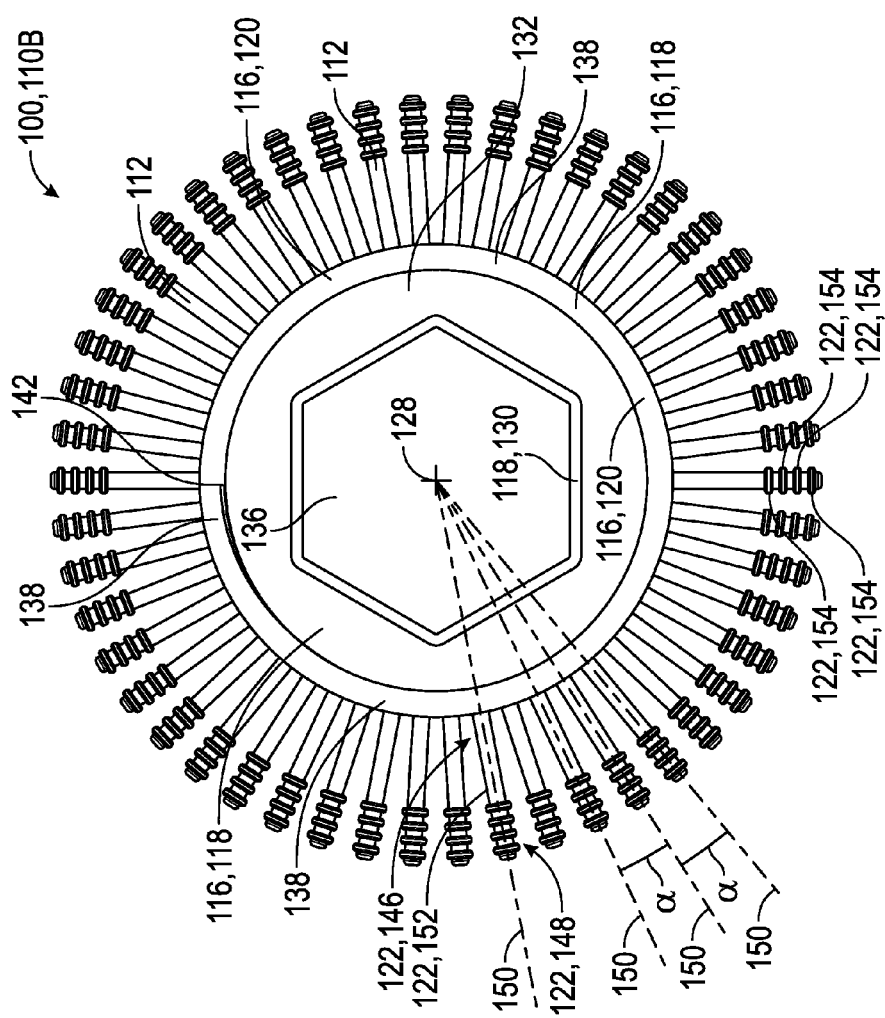
FIG. 4 displays a pictorial, perspective end view of a scrubber disk of a second type in accordance with an example embodiment of the present invention.
Figure 5:
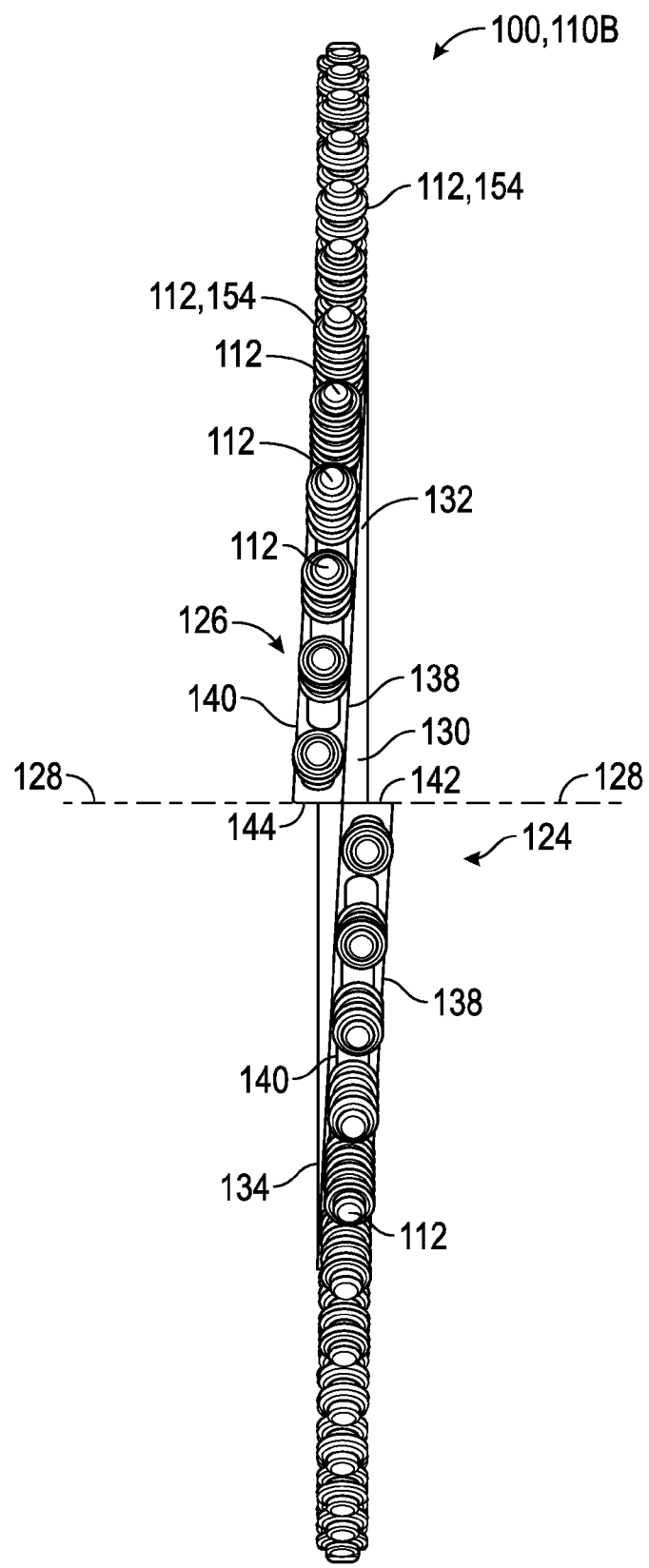
FIG. 5 displays a pictorial, side elevational view of the scrubber disk of FIG. 4.

FIGS. 4 and 5 display pictorial views of a scrubber disk 110B of a second type in accordance with an example embodiment of the present invention. The scrubber disk 110B is substantially similar to scrubber disk 110A with the exception of the number and configuration of the bristles 122 and barbs 154 of each bristle 122. According to the example embodiment, scrubber disk 110B includes fifty-one (51) bristles 122 that are spaced at equal angular intervals around the rim 120 of the scrubber disk 110B. Each bristle 122 has a cross-section perpendicular to the bristle's longitudinal axis 150 having a substantially circular shape. Unlike the body 152 of scrubber disk 110A, the body 152 of each bristle 122 does not taper between the bristle's first and second ends 146, 148 such that the cross-sectional area of the bristle 122 is substantially constant. Additionally, each bristle 122 has four (4) barbs 154, with each barb 154 having a cross-section perpendicular to the bristle's longitudinal axis 150 that has a generally circular shape. The barbs 154 are spaced equally apart along the bristle's longitudinal axis 150. The three (3) barbs 154 nearest the bristle's first end 146 are of substantially the same thickness along the bristle's longitudinal axis 150, while the barb 154 nearest the bristle's second end 148 is thicker along the bristle's longitudinal axis 150 than the other barbs 154.

Figure 6:
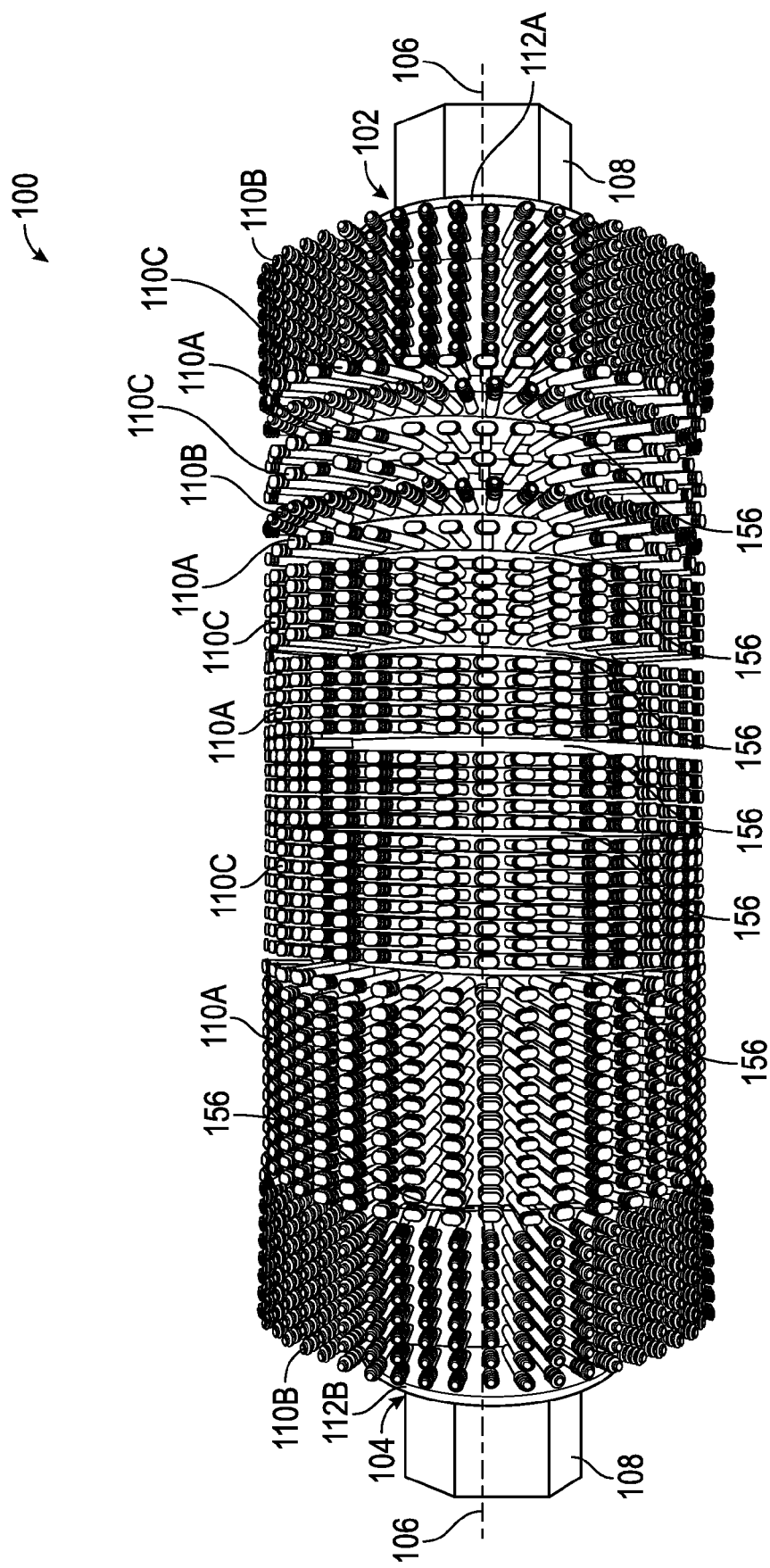
FIG. 6 displays a pictorial, side elevational view of a scrubber of a second configuration, in accordance with an example embodiment of the present invention, including scrubber disks of multiple types and spacer disks located between certain of the scrubber disks.

FIG. 6 displays a pictorial view of a scrubber 100 of a second configuration, in accordance with an example embodiment of the present invention, including scrubber disks 110A, 110B, 110C of multiple types and spacer disks 156 located between certain of the scrubber disks 110A, 110B, 110C. Some of the scrubber disks 110A, 110B, 110C are arranged in groups adjacent to one another with some of the groups having a spacer disk 156 therebetween. Others of the scrubber disks 110A, 110B, 110C are arranged alone and are separated from nearby scrubber disks 110A, 110B, 110C by a spacer disk 156. Similar to the scrubber 100 of the first configuration, the scrubber disks 110A, 110B, 110C are mounted about a drive shaft 108 and are held in respective longitudinal positions along the drive shaft 108 by the retaining collars 112 that are affixed to the drive shaft 108. As illustrated by the scrubber 100 of FIG. 6, a scrubber 100 may be custom configured for almost any task or application using different types of scrubber disks 110, different arrangements and positions of scrubber disks 110, and different spacings of the various scrubber disks 110 along the drive shaft 108.

Figure 7:
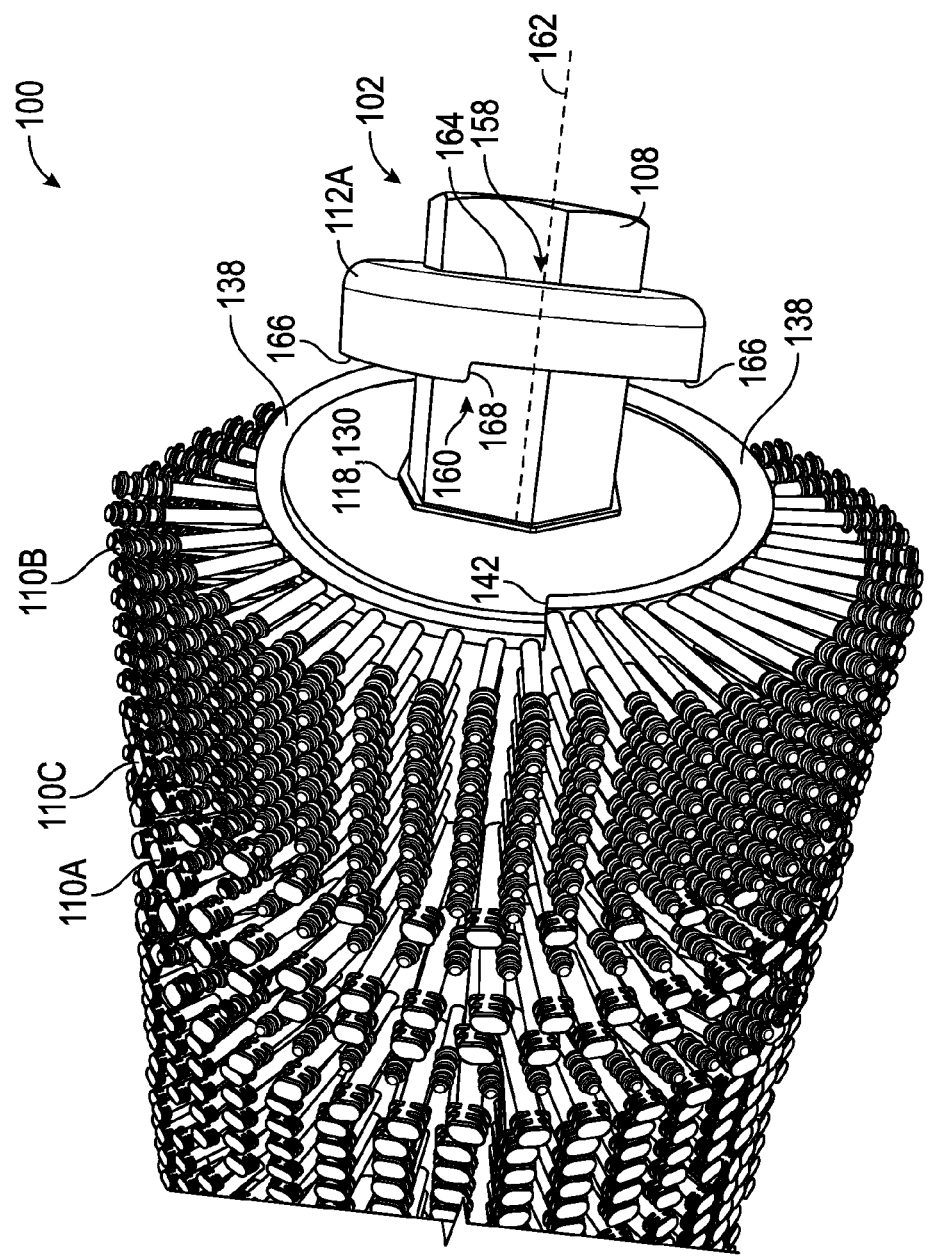
FIG. 7 displays a pictorial, partial perspective side view of the scrubber of FIG. 6, more clearly illustrating a retaining collar located about a drive shaft protruding through and from the scrubber disks and spacer disks near a first end of the scrubber and disengaged from the nearest scrubber disk.
Figure 8:
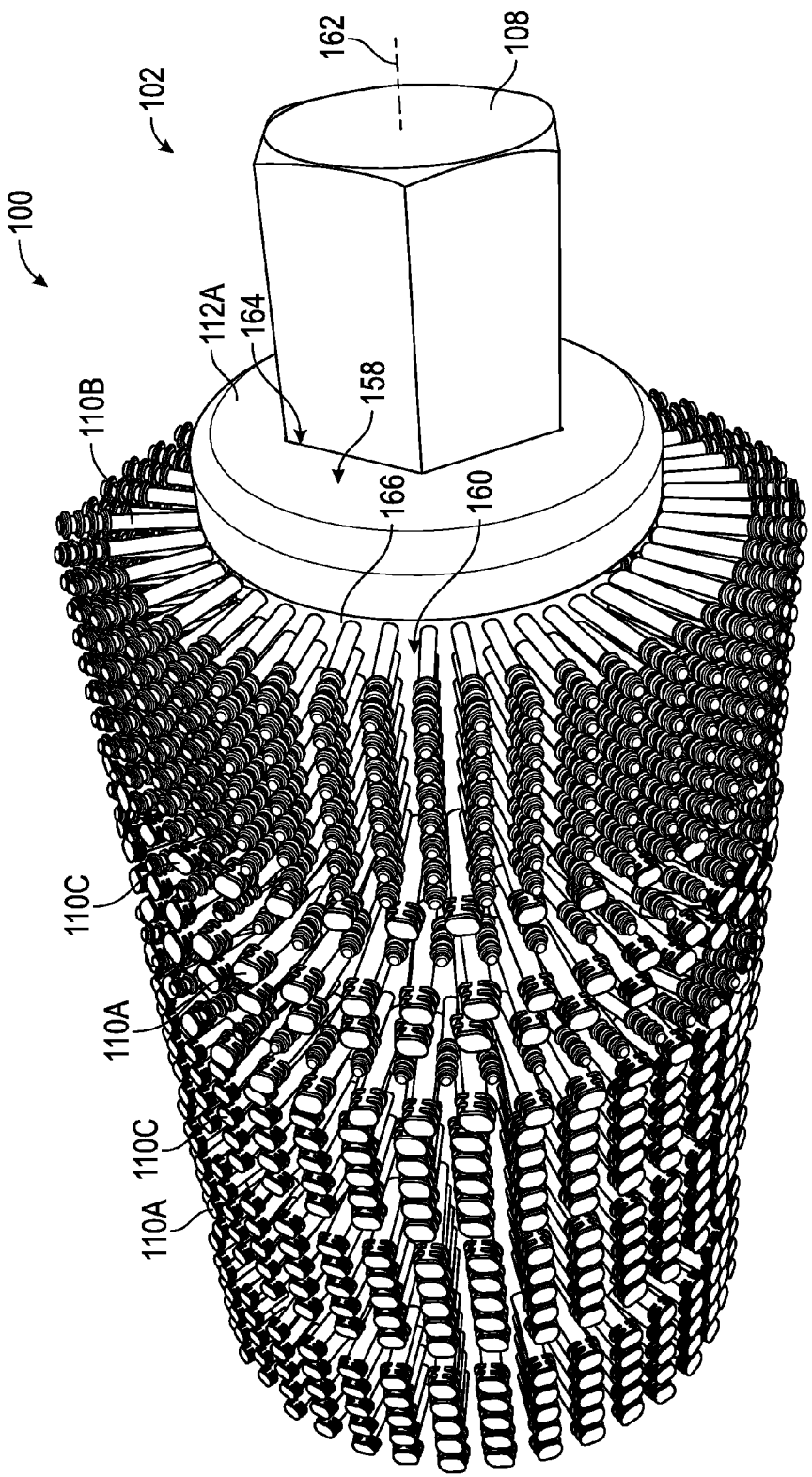
FIG. 8 displays a pictorial, partial perspective side view of the scrubber of FIG. 6, more clearly illustrating a retaining collar located about a drive shaft protruding through and from the scrubber disks and spacer disks near a first end of the scrubber and engaged with the nearest scrubber disk.

FIGS. 7 and 8 display pictorial views of the first end 102 of the scrubber 100 of the second configuration with a retaining collar 112A, respectively, not engaged and engaged with the nearest scrubber disk 110. The retaining collar 112A, similar to the retaining collar 112B at the second end 104 of the scrubber 100, has a first end 158 and an opposed second end 160. The retaining collar 112A defines a central longitudinal axis 162 extending between and through the first and second ends 158, 160. The retaining collar 112A also defines a bore 164 extending therein between the first and second ends 158, 160. The bore 164 is sized and shaped to cooperatively receive the scrubber's drive shaft 108 therethrough, and to prevent relative rotation of the retaining collar 112A about the drive shaft 108. According to the example embodiment, the bore 164 has a hexagonal cross-section perpendicular to the scrubber's central longitudinal axis 106 similar to the hexagonal cross-section of the scrubber's drive shaft 108. However, it should be understood and appreciated that in other embodiments, the bore 164 and drive shaft 108 may have many different cooperative cross-sectional shapes as described above with respect to the drive shaft 108, and the retaining collar 112A and drive shaft 108 may utilize keys/keyways, internal/external teeth, and/or other structures or devices alone or in combination with such cross-sectional shapes to prevent relative rotation of the retaining collar 112A about the drive shaft 108.

Additionally, the retaining collar 112A has a first surface 166 at the collar's second end 160 that forms a portion of a spiral helix about the collar's central longitudinal axis 162 and that is formed for cooperation, contact and engagement with the first or second surfaces 138, 140 of a scrubber disk 110. The retaining collar 112A also has a second surface 168 at the collar's second end 160 that is formed for cooperation, contact and engagement with the third or fourth surfaces 142, 144 of a scrubber disk 110. When the retaining collar 112A is positioned with the collar's first and second surfaces 166, 168 in engagement with a scrubber disk's first and third surfaces 138, 142 (or second and fourth surfaces 140, 144, as the case may be) and is fixed to the drive shaft 108 (for example, via a set screw), the retaining collar 112A prevents movement of scrubber disks 110 and spacer disks 156 along and relative to the scrubber's drive shaft 108.

Figure 9:
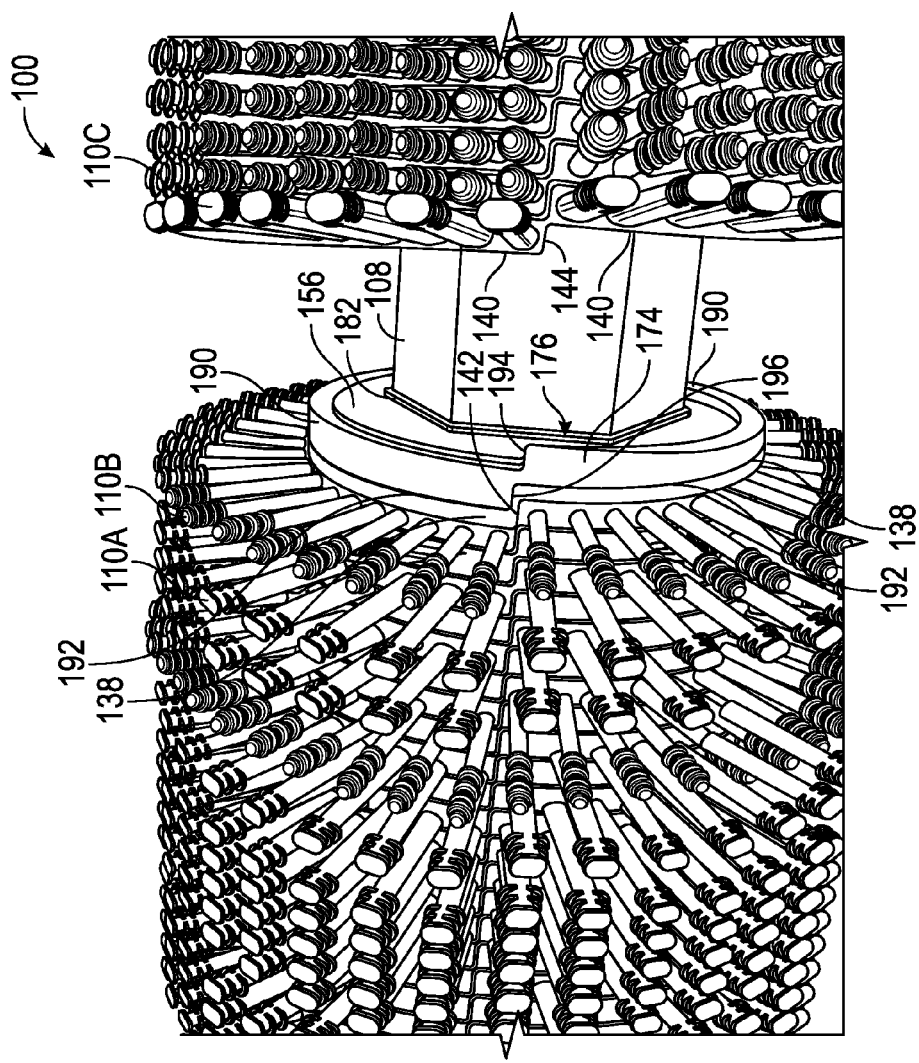
FIG. 9 displays a pictorial, partial perspective side view of the scrubber of FIG. 6, more clearly illustrating a spacer disk located about a drive shaft protruding through and from the scrubber disks and spacer disk, positioned between a scrubber disk of a second type and a scrubber disk of a third type, and adjacent to and engaged with the scrubber disk of the second type.
Figure 10:
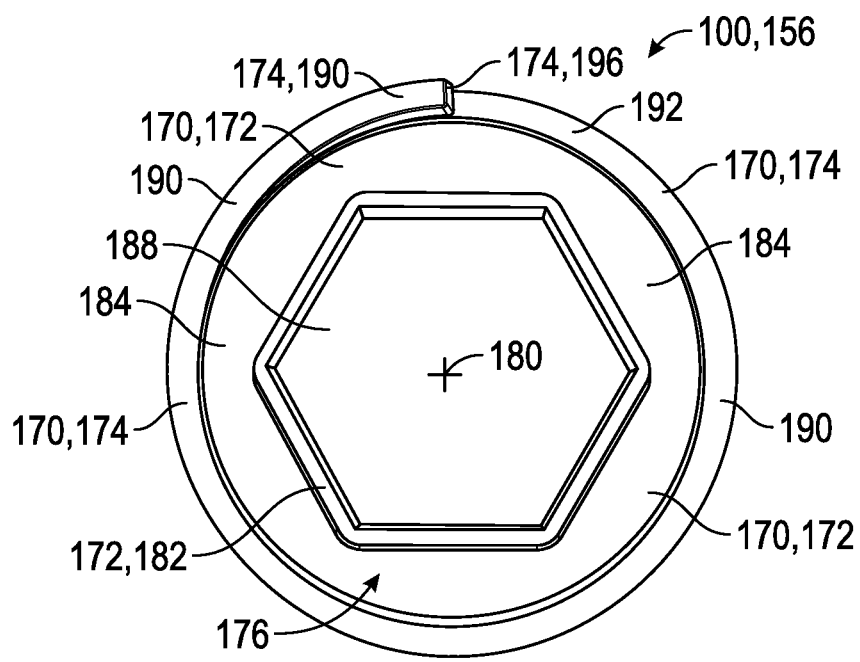
FIG. 10 displays a pictorial, end elevational view of a spacer disk, in accordance with an example embodiment, taken from a first end thereof.
Figure 11:
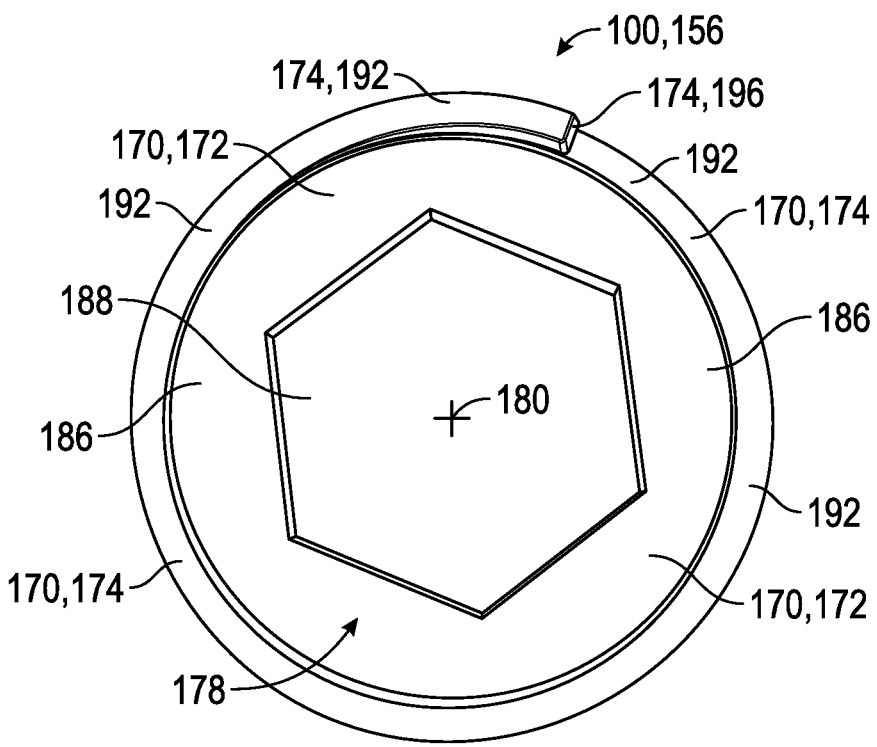
FIG. 11 displays a pictorial, end elevational view of the spacer disk of FIG. 10, taken from a second end thereof.
Figure 12:
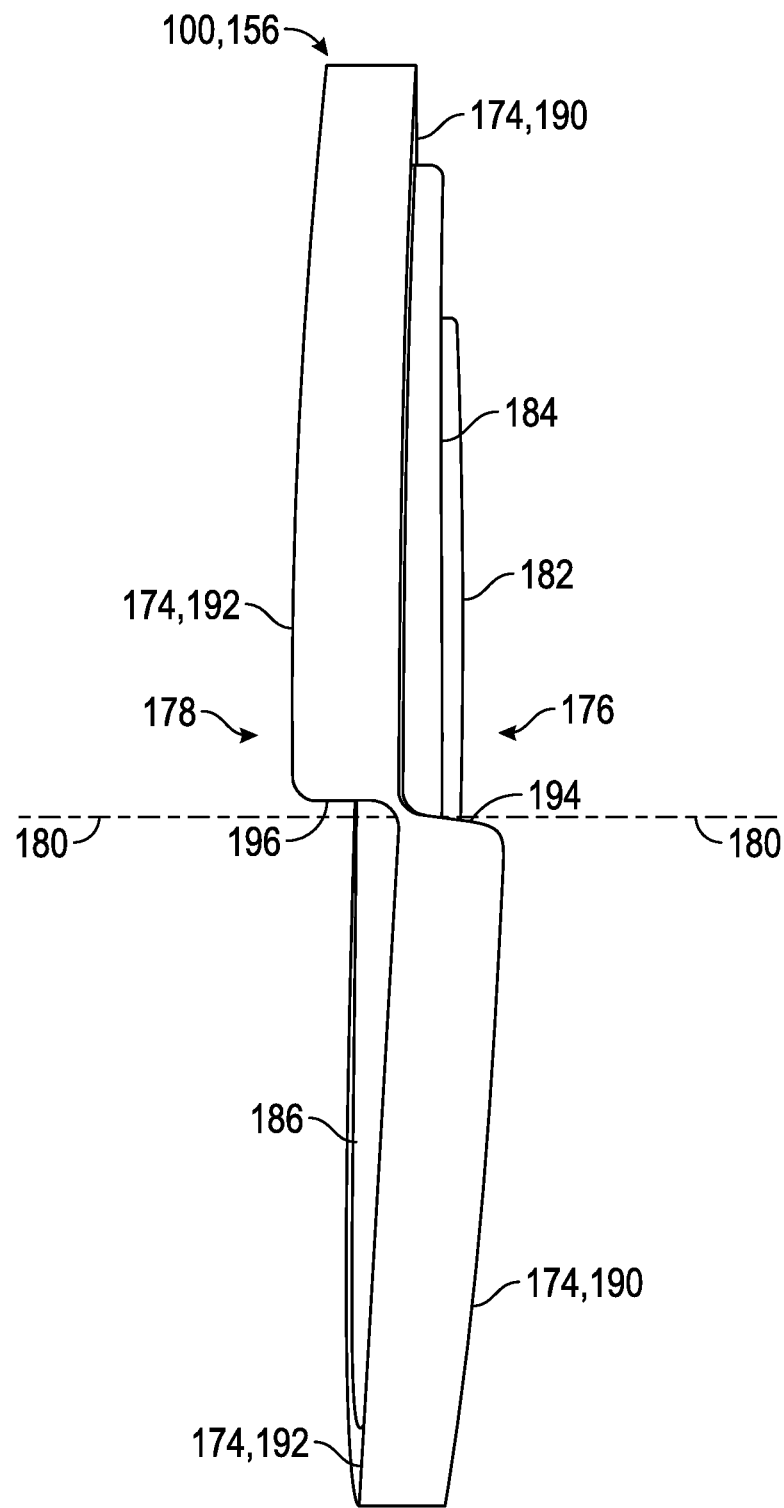
FIG. 12 displays a pictorial, side elevational view of the spacer disk of FIG. 10.

FIG. 9 displays a pictorial view of a portion of the scrubber 100 of the second configuration and more clearly shows a spacer disk 156 located about the drive shaft 108 and positioned between a scrubber disk 110B of a second type and a scrubber disk 110C of a third type, and adjacent to and engaged with the scrubber disk 110B of the second type. The spacer disk 156 is shown alone in FIGS. 10-12 and is substantially similar to a scrubber disk 110, except that the spacer disk 156 does not include any bristles 112. The use of one or more spacer disks 156 in a scrubber configuration enables the longitudinal separation of scrubber disks 110 along the scrubber's drive shaft 108 and permits the custom tailoring of scrubbers 100 for particular applications that have certain types and numbers of scrubber disks 110 located in appropriate, or desired, positions along the scrubber's drive shaft 108.

More particularly, each spacer disk 156 comprises a hub 170 having a web 172 and a rim 174. The web 172 has a substantially cylindrical shape with a first end 176 and an opposed second end 178, and extends radially about and longitudinally parallel to a central longitudinal axis 180 of the spacer disk 156. The web 172 has a boss 182 protruding in the longitudinal direction from the web's surface 184 at the web's first end 176. The boss 182 protrudes from the web's surface 184 by a distance that causes the boss 182 to come into contact with the web surface 134 at the second end 126 of a scrubber disk 110, with the web surface 186 at the second end 178 of another spacer disk 156, or a retaining collar 112 and provide proper registration and spacing of the spacer disk 156 with respect to such scrubber disk 110, other spacer disk 156, or retaining collar 112 in the longitudinal direction along the scrubber's drive shaft 108.

The web 172 and boss 182 define a bore 188 extending therethrough about the spacer disk's central longitudinal axis 180. The bore 188 is sized and shaped to cooperatively receive the scrubber's drive shaft 108 therethrough, and to prevent relative rotation of the spacer disk 156 about the drive shaft 108. According to the example embodiment, the bore 188 has a hexagonal cross-section perpendicular to the spacer disk's central longitudinal axis 180 similar to the hexagonal cross-section of the scrubber's drive shaft 108. However, it should be understood and appreciated that in other embodiments, the bore 188 and drive shaft 108 may have many different cooperative cross-sectional shapes as described above with respect to the drive shaft 108, and the web 172, boss 182 and drive shaft 108 may utilize keys/keyways, internal/external teeth, and/or other structures or devices alone or in combination with such cross-sectional shapes to prevent relative rotation of the spacer disk 156 about the drive shaft 108.

The rim 174 of the spacer disk 156 extends from and around the web 172 through an angular measure of substantially three hundred sixty degrees (360°) and at a radial distance from and about the spacer disk's central longitudinal axis 180 (and at the radial extent of the web 172) to form a portion of a spiral helix about the central longitudinal axis 180. By virtue of the spiral helix form, the rim 174 protrudes partially from the web surface 184 at the spacer disk's first end 176 and partially from the web surface 186 at the spacer disk's second end 178. The rim 174 has a generally constant-size, rectangular cross-section when cut by a plane extending in the spacer disk's longitudinal direction and diametrically from and including the spacer disk's central longitudinal axis 180 (as opposed to a plane extending perpendicular to the central longitudinal axis 180). The rim 174 has a first surface 190 at the spacer disk's first end 176 and a longitudinally opposed second surface 192 at the spacer disk's second end 178. Also, the rim 174 has a third surface 194 at the spacer disk's first end 176 that corresponds to the spiral helix's beginning location, and a fourth surface 196 at the spacer disk's second end 178 that corresponds to the spiral helix's ending location.

In a scrubber 100, the rim's first and third surfaces 190, 194 contact and engage the cooperatively disposed second and fourth surfaces 140, 144 of the rim 120 of a scrubber disk 110, the second and fourth surfaces 192, 196 of another spacer disk 156, or the first and second surfaces 166, 168 of a retaining collar 112 positioned adjacent the first end 176 of the spacer disk 156 to properly register and position the spacer disk 156 relative to a scrubber disk 110, another spacer disk 156, or retaining collar 112. Also, the rim's second and fourth surfaces 192, 196 contact and engage the cooperatively disposed first and third surfaces 138, 142 of the rim 120 of a scrubber disk 110, the first and third surfaces 190, 194 of another spacer disk 156, or the first and second surfaces 166, 168 of a retaining collar 112 positioned adjacent the second end 178 of the spacer disk 156 to properly register and position the spacer disk 156 relative to a scrubber disk 110, another spacer disk 156, or a retaining collar 112. Through the contact, engagement and registration between the surfaces 190, 192, 194, 196 of the spacer disk 156 and those cooperatively disposed surfaces 138, 140, 142, 144 of adjacent scrubber disks 110, surfaces 190, 192, 194, 196 of adjacent spacer disks 156, or surfaces 166, 168 of retaining collars 112, there are essentially no gaps present between the rim 174 of the spacer disk 156 and the cooperatively disposed and engaged rims 120 of scrubber disks 110, rims 174 of other spacer disks 156, or retaining collars 112. Because there are essentially no gaps present, material being removed from an article by the scrubber 100 cannot get trapped between longitudinally the rims 120 of adjacent scrubber disks 110, rims 174 of adjacent spacer disks 156, or retaining collars 112, thereby minimizing the extent of cleaning required to clean the scrubber 100 after use.

In accordance with the example embodiment, the scrubber disks 110 and spacer disks 156 are manufactured from one or more polymer materials selected to provide the scrubber disks 110, spacer disks 156, and their component parts with sufficient strength, rigidity, flexibility, moldability, durability, and/or other structural and usability characteristics appropriate for the task for which the scrubber 100 will be used. However, it should be understood and appreciated that the scrubber disks 110, spacer disks 156, and their component parts may be manufactured from other materials in other embodiments. It should also be understood and appreciated that, in other embodiments, scrubbers 100 may be configured differently from the first and second configurations described herein. In such other embodiments and configurations, the scrubbers 100 may have differently shaped drive shafts 108, may have increased or decreased numbers of scrubber disks 110 and spacer disks 156, may have scrubber disks 110 and spacer disks 156 arranged differently, and may have scrubber disks 110 of different types that have increased or decreased numbers of bristles 122, increased or decreased angular spacing between the bristles 122, bristles 122 having bodies 152 with different cross-sectional shapes, and bristles with different numbers, shapes, spacing, and dimensions of barbs 154. Additionally, it should be understood and appreciated that in other embodiments, the bristles 122 may not be uniformly distributed or arranged at equal angular intervals/spacings around the rim 120 of a scrubber disk 110, or some of the bristles 122 may arranged at equal angular intervals/spacings with respect to certain other bristles 122 while others are not.

A scrubber 100 may be configured and assembled for a particular application by developing, producing, and/or selecting scrubber disks 110 and, as appropriate, combinations of different types of scrubber disks 110, having characteristics that are valuable or beneficial for the application for which the scrubber 100 will be used. The arrangement and order of the scrubber disks 110 and spacer disks, 156, if any, relative to the first and second ends 102, 104 of the scrubber 100 is determined so that scrubber disks 110 are located at particular locations along the drive shaft 108. The scrubber 100 is then assembled by sliding the respective scrubber disks 110 and spacer disks 156, if any, onto the drive shaft 108 in the pre-determined order and oriented about the drive shaft 108 so that the various surfaces of adjacent scrubber disks 110 and spacer disks 156, if any, are in contact and engaged as described above. After all of the scrubber disks 110 and spacer disks 156, if any, are present on the drive shaft 108, the retaining collars 112 are slid onto the drive shaft 108 from the scrubber's respective ends 102, 104 and into engagement with the nearest scrubber disk 110 or spacer disk 156, as appropriate. Then, the retaining collars 112 are secured to the drive shaft 108.

In use, a scrubber 100 is mounted for rotation of the drive shaft 108 at an appropriate rotational speed for the particular application for which the scrubber 100 is used. For example, a scrubber 100 used in a poultry processing facility to remove skin from the feet of poultry birds may be rotated at a speed of approximately two hundred fifty (250) revolutions per minute. Because the scrubber disks 110 of the scrubber 100 are mounted to the drive shaft 108 so that the scrubber disks 110 do not rotate relative to the drive shaft 108, the scrubber disks 110 rotate in unison with the drive shaft 108. Once the scrubber disks 110 and drive shaft 108 are rotating at the appropriate rotational speed for the application, an article from which material is to be removed is introduced into contact with the scrubber disks 110. Rotation of the drive shaft 108 brings the barbs 154 of the scrubber disk bristles 122 repeatedly into contact with the article. The barbs 154 tear and/or pull material from the article. After a desired amount of material is removed, the article is removed from contact with the scrubber disks 110. Because there are virtually no gaps between adjacent scrubber disks 110 or between scrubber disks 110 and adjacent spacer disks 156, the removed material does not become trapped between scrubber disks 110 or spacer disks 156 and, hence, post-use cleaning of the scrubber 100 is easy.

Whereas the present invention has been described in detail above with respect to an example embodiment and configurations thereof, it should be appreciated that variations and modifications might be effected within the spirit and scope of the present invention.

What is claimed is:

1. A scrubber apparatus comprising:
    a scrubbing member defining a central longitudinal axis and including a rim forming a spiral helix about said central longitudinal axis, said scrubbing member further including a bristle, wherein said scrubbing member comprises a first scrubbing member and said scrubber apparatus further includes a second scrubbing member defining a central longitudinal axis and including a rim forming a spiral helix about said central longitudinal axis, said second scrubbing member further including a bristle, wherein said second scrubbing member is positioned longitudinally adjacent said first scrubbing member with said rim of said second scrubbing member interlocked with said rim of said first scrubbing member.

2. The scrubber apparatus of claim 1, wherein said bristle of said first scrubbing member is configured according to a configuration and said bristle of said second scrubbing member is configured according to a configuration, and wherein said configuration of said first scrubbing member is different from said configuration of said second scrubbing member.

3. A scrubber apparatus comprising:
    a scrubbing member defining a central longitudinal axis and including a rim forming a spiral helix about said central longitudinal axis, said scrubbing member further including a bristle, wherein said scrubber apparatus further includes a spacer member defining a central longitudinal axis and including a rim forming a spiral helix about said central longitudinal axis, and wherein said spacer member is positioned longitudinally adjacent said scrubbing member with said rim of said spacer member interlocked with said rim of said scrubbing member.

4. The scrubber apparatus of claim 3, wherein said scrubbing member comprises a first scrubbing member and said scrubber apparatus further includes a second scrubbing member defining a central longitudinal axis and including a rim forming a spiral helix about said central longitudinal axis, said second scrubbing member further including a bristle, wherein said second scrubbing member is positioned longitudinally adjacent said spacer member with said rim of said second scrubbing member interlocked with said rim of said spacer member.

5. The scrubber apparatus of claim 3, wherein said spacer member defines a bore extending therethrough about said central longitudinal axis, said bore being configured to receive a shaft therein and being shaped about said central longitudinal axis for cooperative contact with the perimeter of the shaft such that there is substantially no relative rotation between said spacer member and the shaft when the shaft is present within said bore.

6. The scrubber apparatus of claim 5, wherein said bore has a polygonal shape about said central longitudinal axis.

7. The scrubber apparatus of claim 5, wherein said bore has a hexagonal shape about said central longitudinal axis.

8. A scrubber apparatus comprising:
    a scrubbing member defining a central longitudinal axis and including a rim forming a spiral helix about said central longitudinal axis, said scrubbing member further including a bristle, wherein said scrubber apparatus further includes a collar defining a central longitudinal axis and including a rim forming a spiral helix about said central longitudinal axis, and wherein said collar is positioned longitudinally adjacent said scrubbing member with said rim of said collar interlocked with said rim of said scrubbing member.

9. The scrubber apparatus of claim 8, wherein said collar is adapted to limit translation of said scrubbing member in a longitudinal direction along said central longitudinal axis of said scrubbing member.

10. The scrubber apparatus of claim 8, wherein said collar defines a bore extending therethrough about said central longitudinal axis, said bore being configured to receive a shaft therein and being shaped about said central longitudinal axis for cooperative contact with the perimeter of the shaft such that there is substantially no relative rotation between said collar and the shaft when the shaft is present within said bore.

11. The scrubber apparatus of claim 10, wherein said bore has a polygonal shape about said central longitudinal axis.

12. The scrubber apparatus of claim 10, wherein said bore has a hexagonal shape about said central longitudinal axis.

13. A scrubber apparatus comprising:
    a first scrubbing member defining a central longitudinal axis and including a rim forming a spiral helix about said central longitudinal axis, said first scrubbing member further including a bristle extending directly from said rim and comprising a unitary structure with said rim; and
    a second scrubbing member defining a central longitudinal axis and including a rim forming a spiral helix about said central longitudinal axis, said second scrubbing member further including a bristle, wherein said second scrubbing member is positioned longitudinally adjacent said first scrubbing member with said rim of said second scrubbing member in contact with and substantially paralleling said rim of said first scrubbing member.

14. The scrubber apparatus of claim 13, wherein said bristle of said first scrubbing member is configured according to a configuration and said bristle of said second scrubbing member is configured according to a configuration, and wherein said configuration of said first scrubbing member is different from said configuration of said second scrubbing member.

15. A scrubber apparatus comprising:
a scrubbing member defining a central longitudinal axis and including a rim forming a spiral helix about said central longitudinal axis, said scrubbing member further including a bristle, wherein said scrubber apparatus further includes a spacer member defining a central longitudinal axis and including a rim forming a spiral helix about said central longitudinal axis, and wherein said spacer member is positioned longitudinally adjacent said scrubbing member with said rim of said spacer member in contact with and substantially paralleling said rim of said scrubbing member.

16. The scrubber apparatus of claim 15, wherein said scrubbing member comprises a first scrubbing member and said scrubber apparatus further includes a second scrubbing member defining a central longitudinal axis and including a rim forming a spiral helix about said central longitudinal axis, said second scrubbing member further including a bristle, wherein said second scrubbing member is positioned longitudinally adjacent said spacer member with said rim of said second scrubbing member in contact with and substantially paralleling said rim of said spacer member.

17. A scrubber apparatus comprising:
a scrubbing member defining a central longitudinal axis and including a rim forming a spiral helix about said central longitudinal axis, said scrubbing member further including a bristle, wherein said scrubber apparatus further includes a collar defining a central longitudinal axis and including a rim forming a spiral helix about said central longitudinal axis, and wherein said collar is positioned longitudinally adjacent said scrubbing member with said rim of said collar in contact with and substantially paralleling said rim of said scrubbing member.

18. The scrubber apparatus of claim 17, wherein said collar is adapted to limit translation of said scrubbing member in a longitudinal direction along said central longitudinal axis of said scrubbing member.

19. A scrubber apparatus, comprising:
a scrubbing member defining a central longitudinal axis and including a rim forming a spiral helix about said central longitudinal axis, said scrubbing member further including a bristle extending directly from said rim and comprising a unitary structure with said rim;
wherein said scrubbing member defines a bore extending therethrough about said central longitudinal axis, said bore being configured to receive a shaft therein and being shaped about said central longitudinal axis for cooperative contact with the perimeter of the shaft such that there is substantially no relative rotation between said scrubbing member and the shaft when the shaft is present within said bore.

20. The scrubber apparatus of claim 19, wherein said bore has a polygonal shape about said central longitudinal axis.

21. The scrubber apparatus of claim 19, wherein said bore has a hexagonal shape about said central longitudinal axis.

22. A scrubber apparatus comprising:
a scrubbing member defining a central longitudinal axis and including a rim forming a spiral helix about said central longitudinal axis, said scrubbing member further including a bristle extending directly from said rim and comprising a unitary structure with said rim;
wherein said rim and said bristle are both manufactured from polymeric material.

23. A scrubber apparatus comprising:
a scrubbing member defining a central longitudinal axis and including a rim forming a spiral helix about said central longitudinal axis, said scrubbing member further including a bristle extending directly from said rim and comprising a unitary structure with said rim;
wherein said bristle comprises a first bristle of a plurality of bristles extending from said rim at a respective plurality of angular locations located successively about said central longitudinal axis, wherein a first pair of said bristles respectively located at a first pair of adjacent angular locations define a first angle therebetween about said central longitudinal axis, wherein a second pair of said bristles respectively located at a second pair of adjacent angular locations define a second angle therebetween about said central longitudinal axis, and wherein the angular measure of said first angle is equal to the angular measure of said second angle.

24. A scrubber apparatus comprising:
a scrubbing member defining a central longitudinal axis and including a rim forming a spiral helix about said central longitudinal axis, said scrubbing member further including a bristle extending directly from said rim and comprising a unitary structure with said rim;
wherein said bristle comprises a first bristle of a plurality of bristles extending from said rim at a respective plurality of angular locations about said central longitudinal axis, wherein a first pair of said bristles respectively located at a first pair of adjacent angular locations define a first angle therebetween about said central longitudinal axis, wherein a second pair of said bristles respectively located at a second pair of adjacent angular locations define a second angle therebetween about said central longitudinal axis, and wherein the angular measure of said first angle is different from the angular measure of said second angle.

25. A scrubber apparatus comprising:
a scrubbing member defining a central longitudinal axis and including a rim forming a spiral helix about said central longitudinal axis, said scrubbing member further including a bristle extending directly from said rim and comprising a unitary structure with said rim;
wherein said bristle includes an elongate body extending away from said rim and having at least one barb extending at least partially around said elongate body.

26. The scrubber apparatus of claim 25, wherein said barb has an elliptical shape when viewed in the longitudinal direction of said elongate body.

27. The scrubber apparatus of claim 25, wherein said barb has a rounded rectangular shape when viewed in the longitudinal direction of said elongate body.

28. The scrubber apparatus of claim 25, wherein said barb comprises a first barb and said bristle further includes a second barb extending at least partially around said elongate body.

29. The scrubber apparatus of claim 27, wherein said first barb has a shape when viewed in the longitudinal direction of said elongate body, wherein said second barb has a shape when viewed in the longitudinal direction of said elongate body, and wherein said shape of said first barb is the same as said shape of said second barb.

30. The scrubber apparatus of claim 28, wherein said first barb has a shape when viewed in the longitudinal direction of said elongate body, wherein said second barb has a shape when viewed in the longitudinal direction of said elongate body, and wherein said shape of said first barb is different than said shape of said second barb.

31. The scrubber apparatus of claim 28, wherein said bristle further includes a third barb extending at least partially around said elongate body, wherein said second barb is located intermediate said first barb and said third barb, wherein said first barb and said second barb define a distance therebetween in the longitudinal direction of said elongate body, wherein said second barb and said third barb define a distance therebetween in the longitudinal direction of said elongate body, wherein said distance between said first barb and said second barb is the same as said distance between said second barb and said third barb.

32. The scrubber apparatus of claim 28, wherein said bristle further includes a third barb extending at least partially around said elongate body, wherein said second barb is located intermediate said first barb and said third barb, wherein said first barb and said second barb define a distance therebetween in the longitudinal direction of said elongate body, wherein said second barb and said third barb define a distance therebetween in the longitudinal direction of said elongate body, wherein said distance between said first barb and said second barb is different than said distance between said second barb and said third barb.

* * * * *